(12) United States Patent
Dawson (10) Patent No.: US 8,436,274 B2
(45) Date of Patent: May 7, 2013

(54) HAND SHIELD SYSTEM AND METHOD FOR WELDING

(76) Inventor: Richard Dawson, Ukiah, CA (US)

( * ) Notice: Subject to any disclaimer, the term of this patent is extended or adjusted under 35 U.S.C. 154(b) by 425 days.

(21) Appl. No.: 12/910,873

(22) Filed: Oct. 25, 2010

(65) Prior Publication Data

US 2012/0097649 A1   Apr. 26, 2012

(51) Int. Cl.
*B23K 26/00* (2006.01)
*A61F 9/00* (2006.01)
*F41H 5/00* (2006.01)

(52) U.S. Cl.
USPC .......................... 219/121.64; 2/11; 89/36.01

(58) Field of Classification Search .............. 219/121.63, 219/121.64, 136; 2/11, 16; 89/36.01, 36.05, 89/36.06
See application file for complete search history.

(56) References Cited

U.S. PATENT DOCUMENTS

| | | | | |
|---|---|---|---|---|
| 2,394,136 | A * | 2/1946 | Bakke | 2/16 |
| 3,908,197 | A * | 9/1975 | Griffin | 2/20 |
| 4,161,643 | A * | 7/1979 | Martin et al. | 219/70 |
| 4,843,947 | A * | 7/1989 | Bauer et al. | 89/36.05 |
| 5,241,703 | A * | 9/1993 | Roberts et al. | 2/2.5 |

* cited by examiner

*Primary Examiner* — Sang Paik
(74) *Attorney, Agent, or Firm* — Nwami, PC; Fidel D. Nwamu (57) ABSTRACT

A hand-held shield for welding. The shield includes a rigid metal frame for receiving a user's gloved hand. A substantially rectangular plate is detachably engaged over the rigid metal frame forming a shield to cover and protect the user's gloved hands from slags, molten flames and the like that are typically encountered during welding operations.

16 Claims, 7 Drawing Sheets

HAND SHIELD SYSTEM AND METHOD FOR WELDING

BACKGROUND OF THE INVENTION

The present invention relates to hand protective systems and more specifically to hand protective systems associated with welding operations.

Discrete metal pieces such as steel and wrought iron often need to be combined as necessary to implement any particular project. Horizontal and vertical steel pieces might need to be integrated when they intersect at a corner, for example.

The process most often employed for attaching such discrete metal pieces is welding. Typical welding operations begin by powering electric arc welding and oxyacetylene-powered blow torches to high optimum welding temperatures. Such optimum welding temperatures begin at 350 and can reach extremely high temperatures of 6300 degrees. Next, the welder must wear gloves typically made of leather or fire-retardant fabrics. In some instances, a thin aluminum glazed pad attached to a welder's hand by elastic straps can be worn over the gloves.

Only then can the welding operation begin. The blowtorch in one hand and a welding stick in the other are simultaneously applied to the seam to be welded. As welding operation proceeds, radiant heat slag, flames and molten pools are produced. Here, the fire-retardant gloves worn by welders protect the welder's hands from burns during welding. As the welding operation intensifies or as the duration becomes longer, the radiant heat slag, flames and molten pool often burn through the aluminum-glazed pad and/or the glove subjecting the user to burns.

Another element that is continuously emitted during such welding operations is radiant heat. Radiant heat is transmitted through gloves to the user's hands. At that point, welders either discontinue or rush through the welding operation.

If the welding operation is overhead, radiant heat slags, flames and molten pools fall toward the welder. The gloves and pads may be raised for some limited overhead protection.

It is within this context that the present invention addresses one or more disadvantages of conventional systems and methods.

BRIEF SUMMARY OF THE INVENTION

Various aspects of a hand-shield system for welding can be found in exemplary embodiments of the present invention.

In a first embodiment, a system for shielding a user's hands during welding is disclosed. The system includes a rigid frame preferably made of metal or other comparable materials. Here, the rigid frame forms an aperture that can receive the gloved hand of the user. This rigid frame includes a top frame and two side frames. And its bottom plane is moreover bounded by two or more springs.

A plate, preferably made of polished aluminum, includes grooves that can receive the top frame of the rigid frame. The grooves engage the top frame so that the plate is slide-able along over the top frame forming a shield to cover and protect said user's gloved hand from slags and torch burns and the like during a welding operation.

As the welding operation intensifies, and unlike conventional systems, the radiant heat slag, flames and molten pool do not burn through the gloved hands of the user as the plate shields the glove to provide significant protection. Moreover, transmission of radiant heat that is continuously emitted during such welding operations is considerably reduced by an air gap between the plate and the user's gloved hand. Welders need not discontinue or rush through welding operations as in conventional systems. If the welding operation is overhead, the plate is slid further out to shield against flames and molten pools that fall toward the welder.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
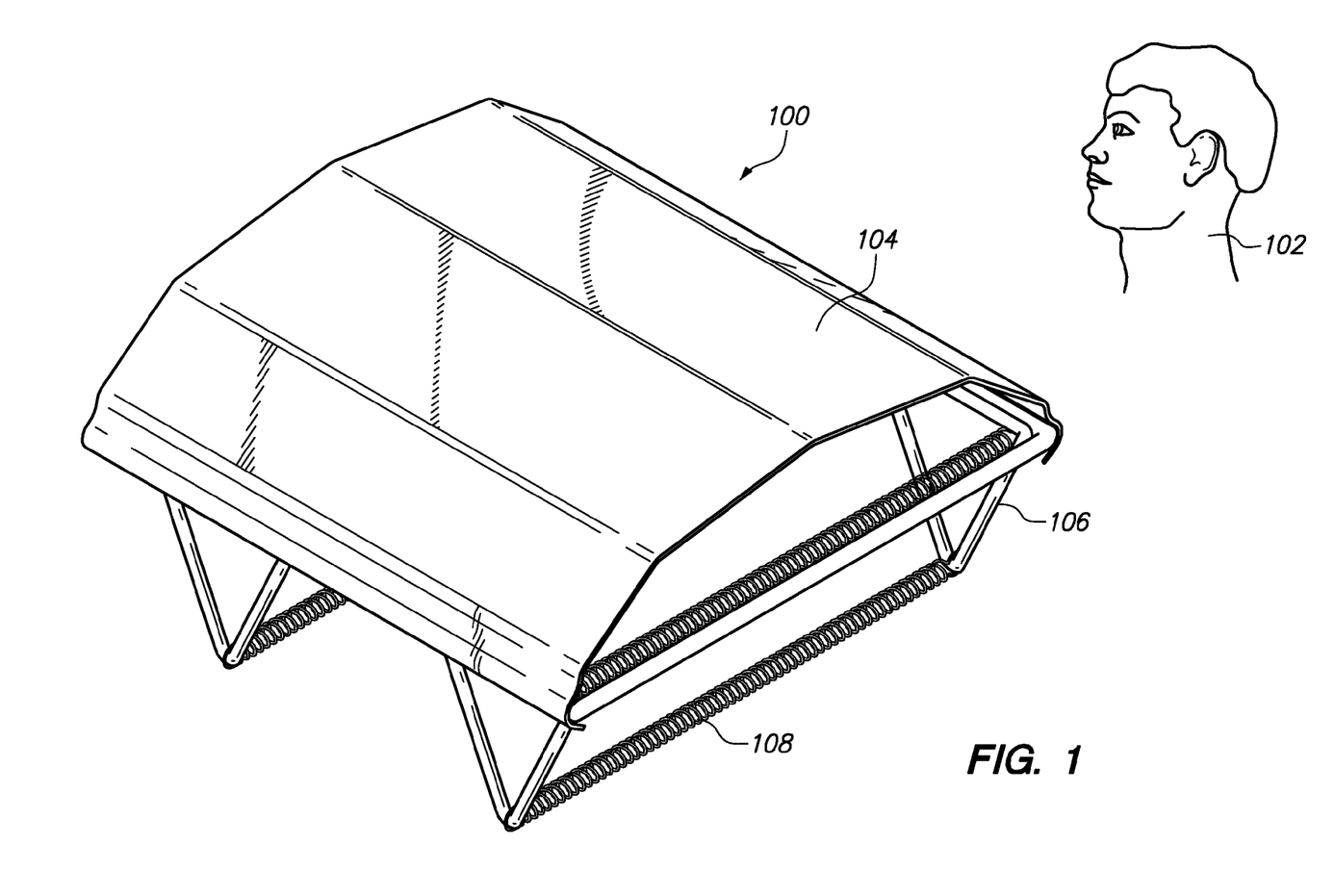
FIG. 1 illustrates a hand-held protective system in accordance with an exemplary embodiment of the present invention.

FIG. 1 illustrates hand-held protective system 100 in accordance with an exemplary embodiment of the present invention.

In FIG. 1, user 102 can utilize hand-held protective system 100 as protection against slags, torch burns and the like that are typically encountered during welding operations. Hand-held protective system 100 comprises plate 104 that is slideably coupled to rigid frame 106. As shown, rigid frame 106 is a metal structural support that forms a cavity that is substantially dimensioned to receive user 102's gloved hand.

Figure 2:
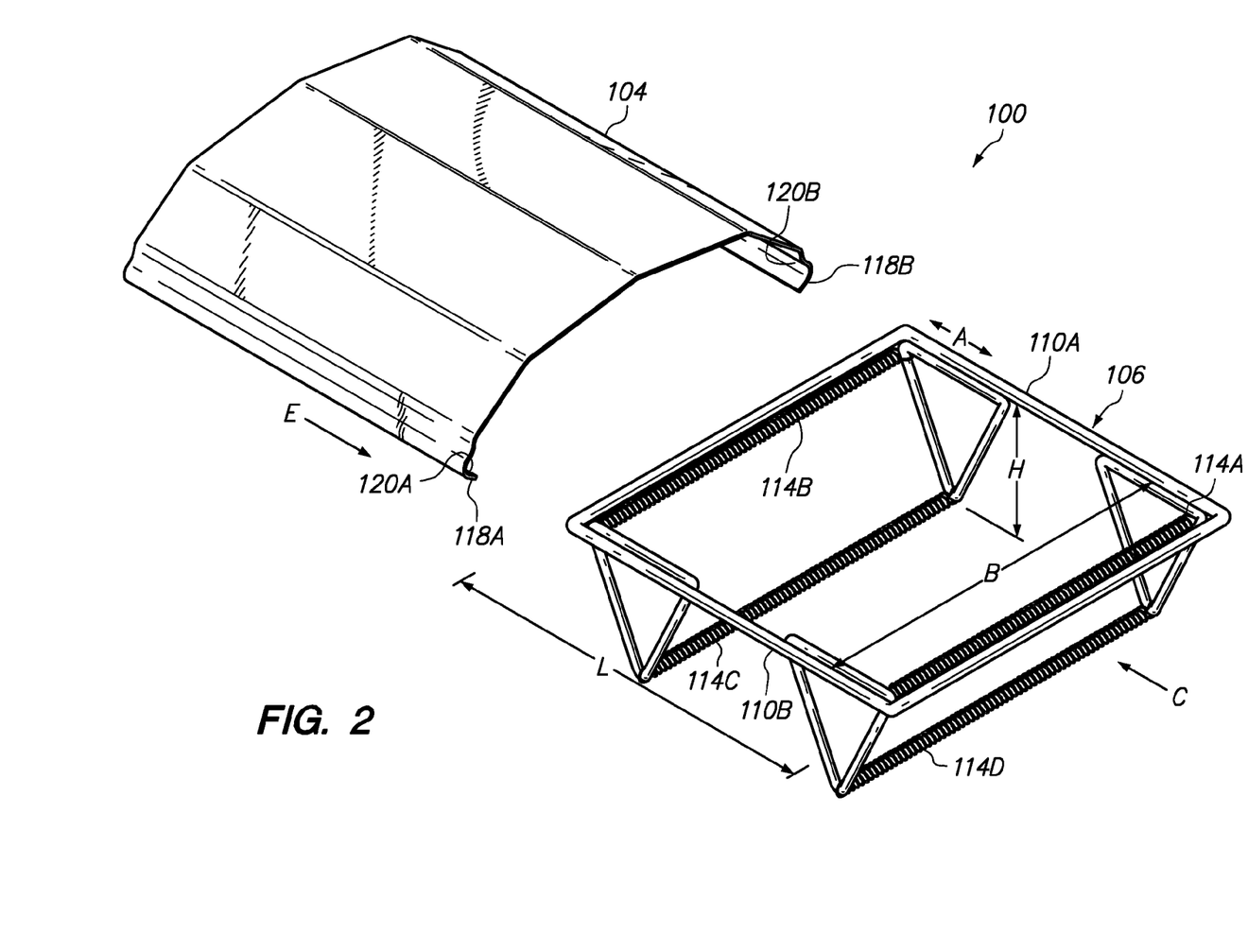
FIG. 2 illustrates a hand-held protective system according to the exemplary embodiment of FIG. 1.

Rigid frame 106 is such that when the gloved hand of user 102 is inserted, plate 104 can be slid over rigid frame 106 by moving plate 104 in a forward or backward direction depicted by arrow A in FIG. 2. As such, when in place, plate 104 can be utilized to cover rigid frame 106 for protection against adverse elements associated with welding operations. In addition to rigid frame 106, hand-held protective system 100 further comprises a plurality of springs 114A, 114B (not shown), 114C, 114D all of which are further described with reference to FIG. 2 below.

FIG. 2 illustrates hand-held protective system 100 according to the exemplary embodiment of FIG. 1.

In FIG. 2, hand-held protective system 100 shows plate 104 and rigid frame 106 detached. Plate 104 and rigid frame 106 are integrate-able (or detachable) by sliding plate 104 along an appropriate direction depicted by arrow A. When plate 104 is in place, user 102 can utilize the present invention for protection against adverse elements associated with welding operations. Further features of FIG. 2 are described with further reference to FIG. 3.

Figure 3:
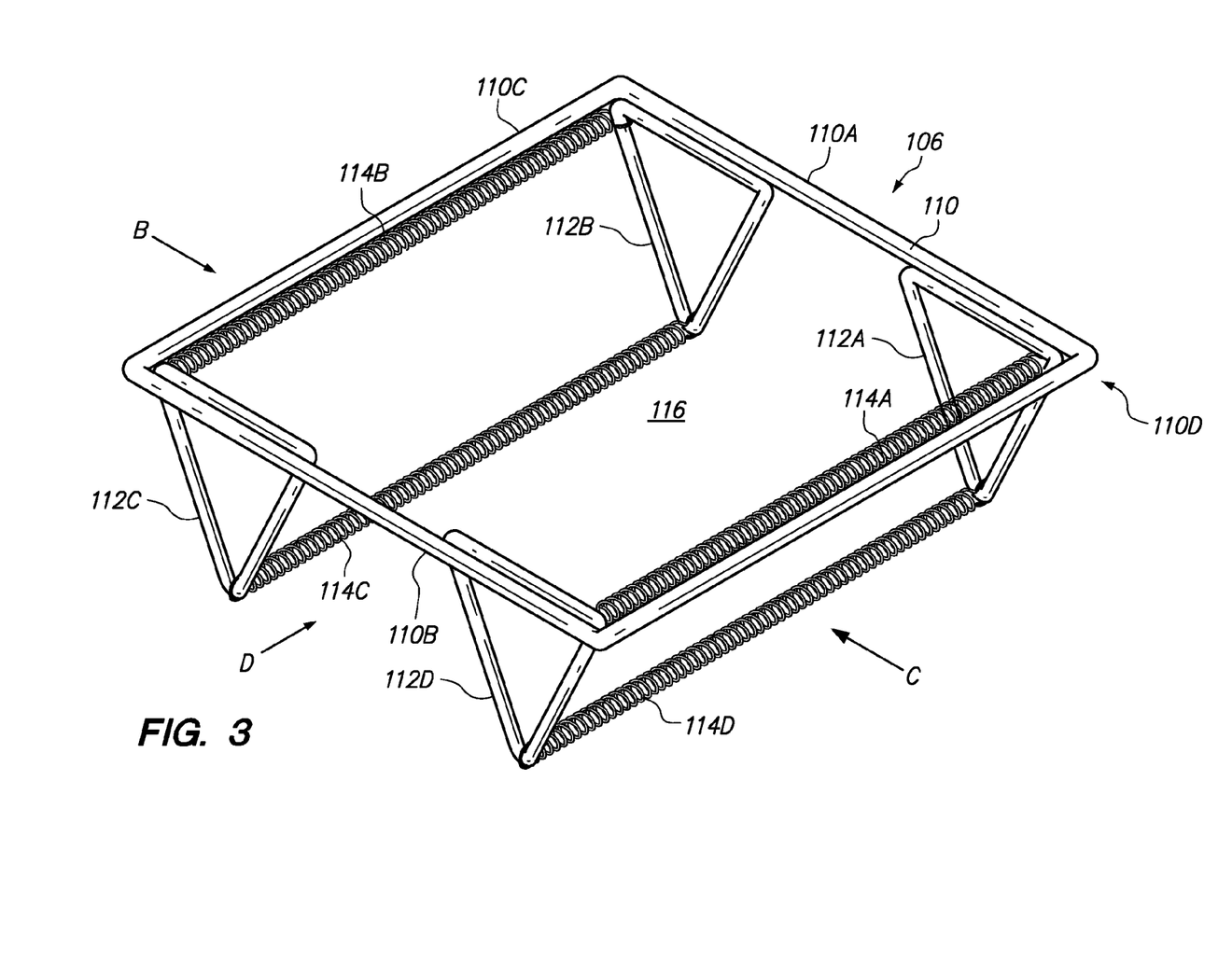
FIG. 3 is a perspective view of the rigid frame of FIG. 2 according to an exemplary embodiment of the present invention.

FIG. 3 is a perspective view of rigid frame 106 of FIG. 2 according to an exemplary embodiment of the present invention.

In FIG. 3, rigid frame 106 defines a cavity 116 that is dimensioned to receive the gloved hand of user 102. Rigid frame 106 might be made of wrought iron, cold rolled steel or other comparable metals or alloys having high tensile strength. Preferably, rigid frame 106 is formed of $3/16^{th}$ cold-rolled steel.

Cavity 116 has dimensions length L, breadth B and height H that are proportioned so as to comfortably receive an adult gloved hand. In one embodiment, the dimension of rigid frame 106 is 6 inches (15.24 cm) by 4½ inches (11.43 cm) by 2 inches (5.08 cm). One skilled in the art will understand that the aforementioned dimensions are exemplary.

Cavity 116 of rigid frame 106 is bounded on top by a horizontal plane defined by top frame 110 having two longer sides 110A and 110B and two shorter sides 110C and 110D. Although depicted as a substantially rectangular frame, top frame 110 can be any shape (e.g., square) consistent with the spirit and scope of the present invention.

Cavity 116 is also bounded on one side by a vertical plane defined by side frame 112A and side frame 112B. And cavity 116 is also bounded on the oppositely disposed side by a vertical plane defined by side frame 112C and side frame 112D. As shown, each side frame is substantially triangular in shape. This substantially triangular configuration enhances the rigidity and use of rigid frame 106.

Although not shown, each side frame 112A, 112B, 112C and 112D may be right-angled. The right angle might be formed between plate 104 and the innermost leg of each side frame 112A, 112B, 112C and 112D. In this manner, when inserted in one direction, the user's gloved fingers extend further out than the leading edge of plate 104 such that the fingers attain a greater degree of freedom. Here, the gloved fingers are easily manipulable and can be turned right, left, etc. without hindrance by plate 104. Work articles also become more manipulable.

When the gloved fingers are inserted into cavity 116 in the opposite direction, plate 104 extends further over the user's gloved fingers for extended protection over the fingers. In this instance, the gloved fingers might be 1-2 inches (2.54-5.08 cm) behind the leading edge of plate 104.

Side frame 112B is attached to a distal end of longer side 110A in a substantially perpendicular manner. Oppositely disposed side frame 112C is also attached at a corresponding position to longer side 110B in a substantially perpendicular manner, while side frame 112D is attached also in a substantially perpendicular manner to a proximal end of longer side 110B at a position corresponding to that of side frame 112A. Of course, one skilled in the art will realize that the rectangular shape of the side frames is exemplary and the angle in which they are attached to top frame 110 are exemplary. The side frames are attached along the aligned segments so that two vertices lie on the corresponding longer side 110A or 110B.

In FIG. 3, hand-held protective system 100 also comprises a plurality of springs 114A, 114B, 114C and 114D. Here, cavity 116 is bounded at the bottom by a vertical plane defined by spring 114C and spring 114D. In addition to forming a bottom plane, spring 114D forms an opening with spring 114A through which the gloved hand of user 102 can be inserted. Similarly, spring 114C forms an opening with spring 114B for receiving the user's gloved hand.

The springs serve to secure user 102's hand in place when inserted into cavity 116. The springs also serve an additional functionality. They conduct heat away from user 102's gloved hand during a welding operation. Spring 114A extends from an upper portion of side frame 112A to a corresponding position on side frame 112D. Spring 114D also extends from a lower portion of side frame 112A to a corresponding position on side frame 112D in order to form the aforementioned opening.

Similarly, spring 114B extends from an upper portion of side frame 112B to a corresponding position on side frame 112C while spring 114C extends from a bottom portion of side frame 112B to a bottom portion of side frame 112C as shown. Springs 114A, 114B, 114C and 114D can be made of hardened or tempered steel or other comparable materials. In an embodiment, each spring is 4⅜ inches (11.13 cm) long, ⅜ inches (0.95 cm) thick and is made of stainless steel.

Although not shown, one skilled in the art will realize that other comparable means for securing the user's gloved hand can be utilized. For example, such means for securing might be two flexible metals, each extending from opposite side frames and each having a metal buckle for fastening around the user's wrist.

Figure 4:
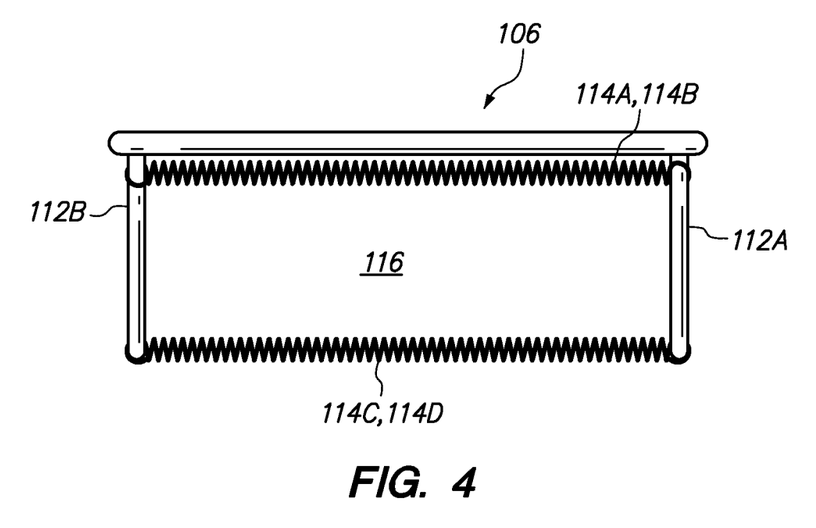
FIG. 4 illustrates a front view of the rigid frame according to an exemplary embodiment of the present invention.

FIG. 4 illustrates a front view of rigid frame 106 according to an exemplary embodiment of the present invention.

In FIG. 4, a front view observed from direction B or a direction C in FIG. 3 is illustrated. As can be seen, spring 114A disposed between side frame 112A and 112B is shown. Spring 114D also disposed between side frame 112A and side frame 112B is also shown. It is the opening between spring 114D and 114A in which the gloved hand of user 102 can be inserted into cavity 116.

Figure 5:
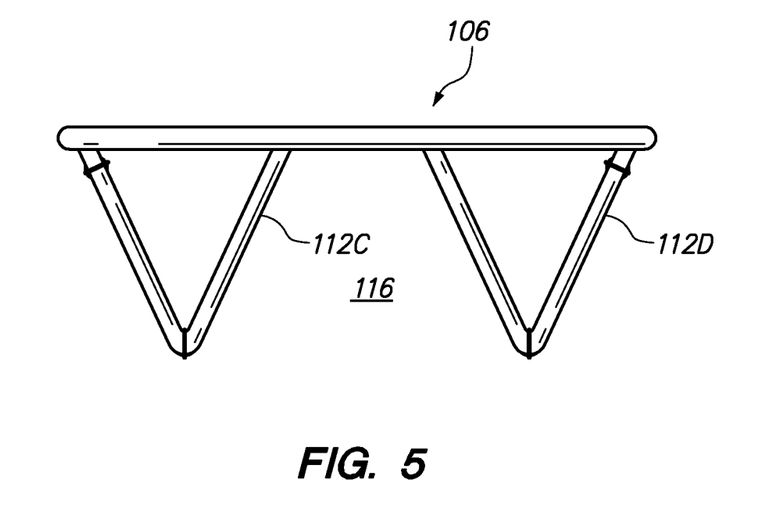
FIG. 5 illustrates a side view of the rigid frame according to an exemplary embodiment of the invention.

FIG. 5 illustrates a side view of rigid frame 106 according to an exemplary embodiment of the invention.

In FIG. 5, side frame 112C and side frame 112D are viewable from a direction D (FIG. 3). Note that the springs are omitted for clarity.

Referring now to FIGS. 1, 2 and 3, the use and operation of hand-held protection system 100 will now be described.

In use, and with reference to FIG. 2, prior to welding, user 102 begins to use the hand-held protective system for protection against adverse welding conditions by sliding plate 104 in a direction E over rigid frame 106 until lips 118A and 118B engage top frame 110. Specifically, lip 118B engages longer side 110A of top frame 110 and lip 118A engages longer side 110B of top frame 110. Plate 104 is continuously slid until it completely covers top frame 110.

At this point, longer side 110A is completely engaged by lip 118B and its groove 120B while longer side 110B is completely engaged by lip 118A and its groove 120A. When plate 104 completely covers top frame 110, hand-held protective system 100 is as shown in FIG. 1. Next, user 102 inserts a gloved hand in a direction C into cavity 116 (FIG. 4C also shows a view from direction C).

Insertion is such that the back of the gloved hand of user 102 faces spring 114A while the palm side faces spring 114B. The gloved hand is completely inserted into the cavity until all four fingers (except the thumb) project past the plane defined by spring 114B and spring 114C at the other end. Depending on which direction or which hand is inserted, the thumb projects past the vertical plane defined by side frames 114C and 112D or side frames 112B or 112A. Once completely inserted, the gloved hand is free to hold materials or to hold discrete metal pieces that are to be welded. As desired, plate 104 can be slid forwards or backwards on top frame 110 depending upon the protection required by user 102.

As the welding operation intensifies, and unlike conventional systems, the radiant heat slag, flames and molten pool do not burn through the gloved hands of user 102 as plate 104, which is typically formed of polished aluminum shields the glove to provide significant protection. Moreover, transmission of radiant heat that is continuously emitted during such welding operations is considerably reduced by an air gap (FIGS. 6A and 6B) between plate 104 and the gloved hand of user 102. Welders need not discontinue or rush through welding operations as in conventional systems. If the welding operation is overhead, plate 104 is slid further out to shield against flames and molten pools that fall toward the welder. Note also that the hands can be slid into the hand-held protective system in either direction depending upon the degree of freedom or amount of protection desired for the fingers.

Figure 6A:
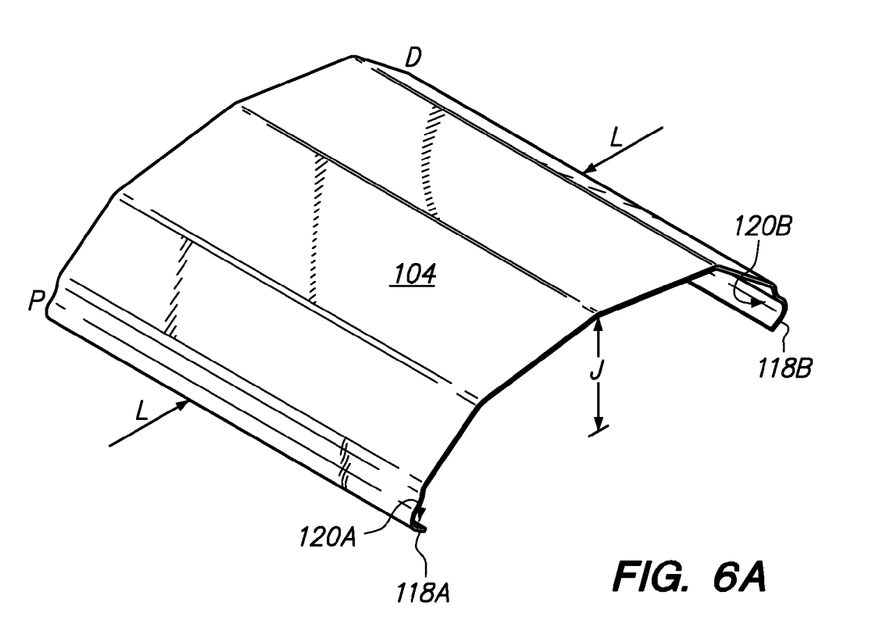
FIG. 6A illustrates the plate of FIG. 1 according to an exemplary embodiment of the present invention.

FIG. 6A illustrates plate 104 of FIG. 1 according to an exemplary embodiment of the present invention.

In FIG. 6A, plate 104 is preferably polished aluminum, the shape of which is substantially rectangular and has a length and breadth substantially dimensioned to correspond to that of top frame 110 of rigid frame 106. In an exemplary embodiment, the dimension of plate 104 is 6½ inches (16.51 cm) by 4½ inches (11.43 cm) by 1 inch (2.54 cm). Note that plate 104 is a wearable item that is expendable.

Plate 104 has a curvature from approximately P to a distal end D. The curvature curves around proximal end P to form lip 118A. Similarly, the curvature curves around past distal end D so as to form lip 118B. Lip 118A and 118B incorporate grooves 120A, 120B respectively through which the sides, specifically longer side 110A and longer side 110B of top frame 110 can be inserted.

Plate 104 also forms an air gap region having length J (FIG. 6B) between the top of the plate and the plane formed by top frame 110. Preferably, length J is generally about 1 inch. This air gap region forms a protective layer that insulates and prevents heat from transferring from the welding operations shielded by plate 104 to the gloved hand of user 102.

Figure 6B:
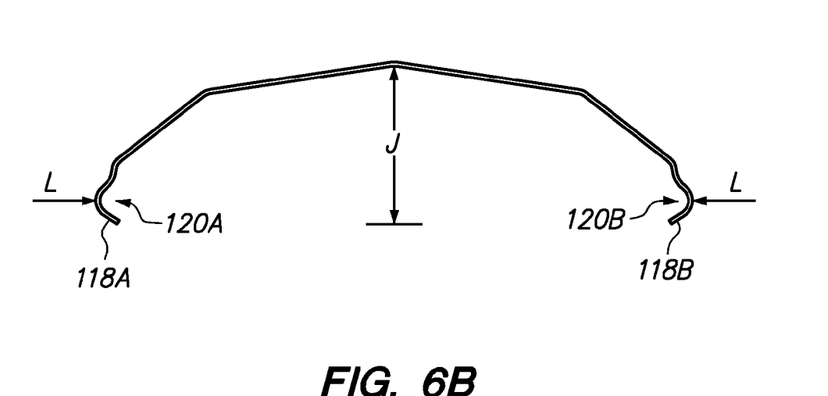
FIG. 6B illustrates a cross section of the plate of FIG. 6A according to an exemplary embodiment of the present invention.

FIG. 6B illustrates a cross section of plate 104 of FIG. 6A according to an exemplary embodiment of the present invention.

In FIG. 6B, the cross section is taken along a line L of FIG. 6A. As can be seen, the plate 104 begins on one side at lip 118A and extends with the curvature to the other side ending at lip 118B. Preferably, plate 104 is made of high-tensile aluminum or other comparable materials having a thickness of $1/64^{th}$ inch.

Figure 7:
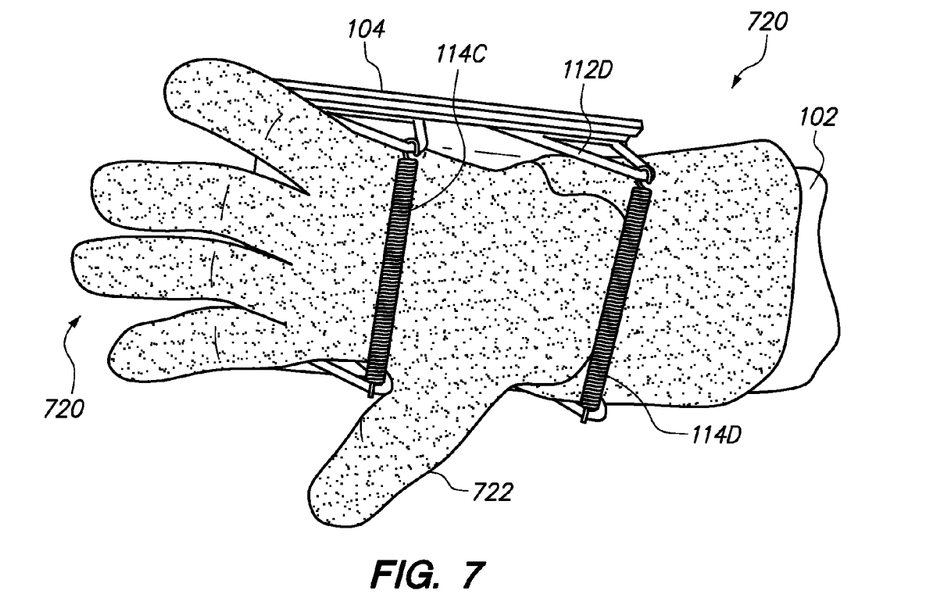
FIG. 7 illustrates a bottom view of a hand-held protective system according to an exemplary embodiment of the present invention.

FIG. 7 illustrates a bottom view of hand-held protective system 100 according to an exemplary embodiment of the present invention.

In FIG. 7, specifically, a bottom view of hand-held protective system 100 when user 102's gloved left hand is fully inserted is shown. User 102's four fingers 720 project past the plane defined by springs 114C and 114B (not shown). Springs 114C and springs 114D can be seen. Spring 114C secures the user's palm within the cavity and provides flexibility of movement to the user's hand. Spring 114D secures the user's wrist such that the gloved hand is retained within cavity 116. The user's thumb 722 projects towards the side past the vertical plane defined by side frames 112A (not shown) and 112B (not shown). Note that user 102's fingers are more under plate 104 and are thus more protected relative to FIG. 9.

Figure 8:
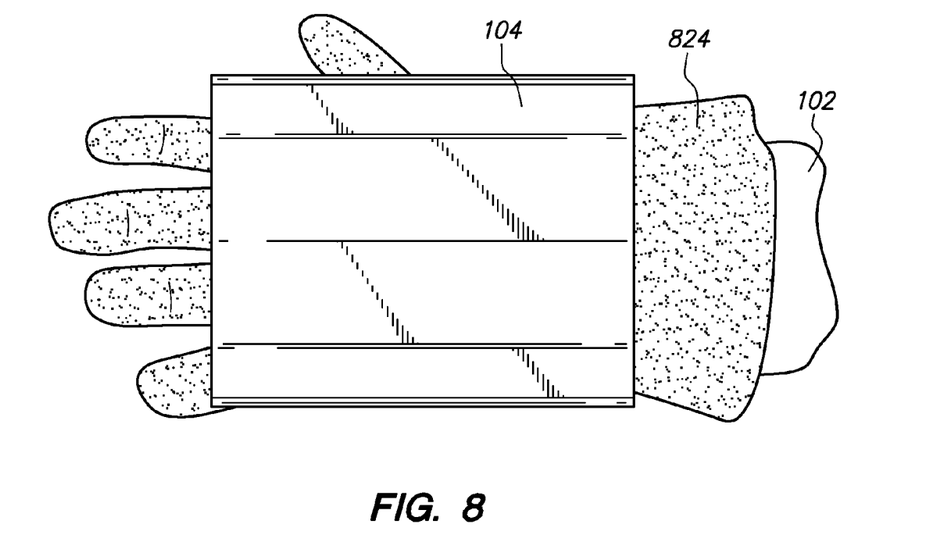
FIG. 8 illustrates a top view of a hand-held protective system according to an exemplary embodiment of the present invention.

FIG. 8 illustrates a top view of hand-held protective system 100 according to an exemplary embodiment of the present invention.

In FIG. 8, the exterior of plate 104 is shown. Plate 104 acts as a shield to protect glove 824 and user 102's hands contained therein. In one embodiment, the exterior of plate 104 is a series of contiguous flat surfaces.

Figure 9:
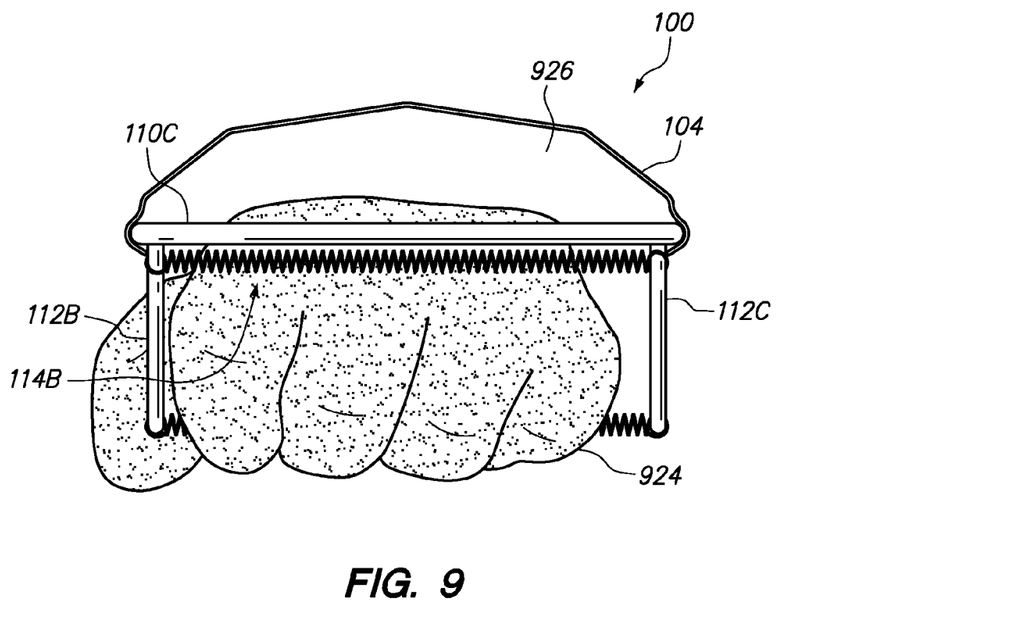
FIG. 9 illustrates a front view of a hand-held protective system according to an exemplary embodiment of the present invention.

FIG. 9 illustrates a front view of hand-held protective system 100 according to an exemplary embodiment of the present invention.

In FIG. 9, specifically, a front view of the gloved hand of user 102 when inserted in hand-held protective system 100 is shown. The front edge of plate 104 is shown projecting over the user's folded, gloved knuckle 924. This gloved knuckle 924 is shown between frame 114B and 114C (not shown), which the user's palm wraps around. Note that insertion of the gloved hand in the direction shown exposes more of the fingers because user 102's fingers are not completely covered by plate 104. Consequently, articles held by the fingers are more manipulable relative to the opposite direction.

Shorter side 110C of frame 110 is shown immediately above spring 114B. Side frame 112B and side frame 112C to which spring 114B is attached are also shown. Note that air gap 926 exists between the plate 104 and the user's gloved knuckle 924. Air gap 926 forms a barrier that prevents heat from reaching gloved knuckle 924. Adverse elements such as slags and molten flames are stopped by plate 104, and any heat is dissipated by plate 104, air gap 926 and spring 114B.

Figure 10:
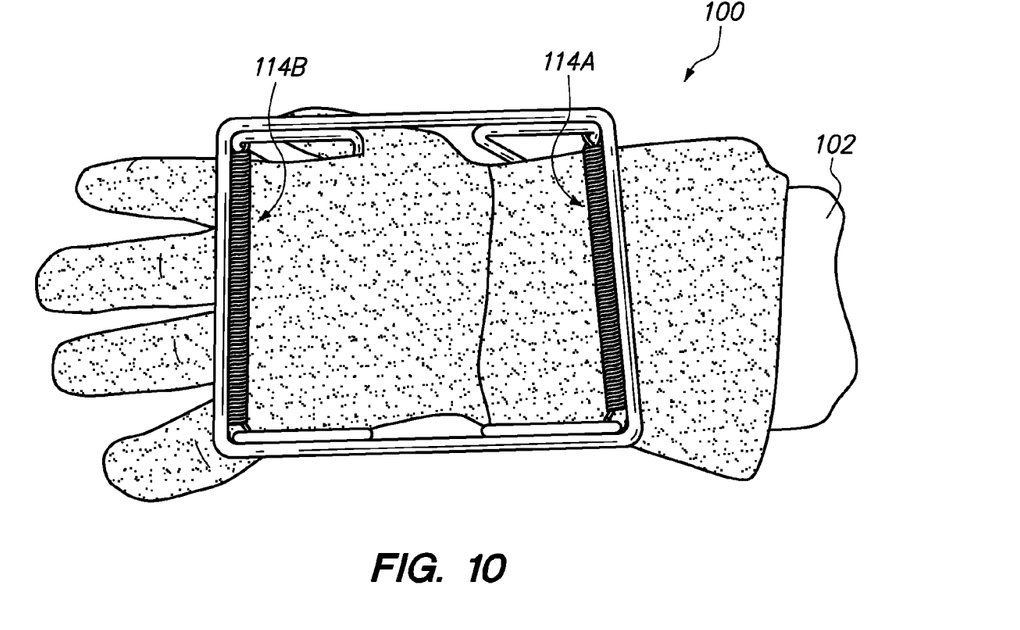
FIG. 10 illustrates a top view of a hand-held protective system when a user's left hand is inserted into a cavity of the hand-held protective system.

FIG. 10 illustrates a top view of hand-held protective system 100 when user 102's hand is inserted into cavity 116.

In FIG. 10, a top view of hand-held protective system 100 is shown without plate 104 covering top frame 110. Spring 114A and spring 114B are also shown adjacent to top frame 110. User 102's projecting fingers are also shown; the projecting fingers remain flexible to grasp work articles and other equipment as needed.

While the above is a complete description of exemplary specific embodiments of the invention, additional embodiments are also possible. Thus, the above description should not be taken as limiting the scope of the invention, which is defined by the appended claims along with their full scope of equivalents.

I claim:

1. A system for shielding a user's hand during welding, said system comprising:
    a rigid frame substantially dimensioned to receive a user's gloved hand, wherein said rigid frame includes a top frame that is substantially rectangular and having two longer edges, wherein said rigid frame includes two side frames that are substantially perpendicular to said top frame, and wherein said rigid frame includes a bottom plane defined by at least one means for securing said user's gloved hand within said rigid frame; and
    a substantially rectangular plate with each of its two longer edges including a top frame receiving means, wherein each top frame receiving means engages each of said longer edges of said top frame such that said substantially rectangular plate slides over said top frame forming a shield to cover and protect said user's gloved hand from slags and torch burns and the like during a welding operation.

2. The system of claim 1 further comprising an air barrier between said top frame and said substantially rectangular plate.

3. The system of claim 1 wherein said means for securing is a metal spring.

4. The system of claim 1 wherein said means for securing is a flexible metal with buckles.

5. The system of claim 1 wherein said top frame receiving means is a groove.

6. The system of claim 1 wherein said rigid frame dimensions are 6 inches (15.24 cm) by 4½ inches (11.43 cm) by 2 inches (5.08 cm).

7. The system of claim 1 wherein each of said two side frames includes at least one substantially triangular section.

8. The system of claim 1 wherein said substantially triangular section is coupled along its first vertex and its second vertex to said top frame.

9. The system of claim 1 wherein said substantially triangular section and said top frame are coupled along a line segment between a first vertex and a second vertex.

10. A system comprising:
    a frame substantially dimensioned to receive a user's gloved hand, wherein said frame includes a top frame that is substantially rectangular and having two longer edges, wherein said frame includes two side frames that are coupled to said top frame, and wherein said frame includes a bottom plane defined by at least one spring for securing said user's gloved hand within said frame; and
    a substantially rectangular plate with each of its two longer edges including a groove, wherein each groove engages each of said longer edges of said top frame such that said substantially rectangular plate slides over said top frame forming a shield to cover and protect said user's gloved hand.

11. The system of claim 10 further comprising an air barrier between said top frame and said substantially rectangular plate.

12. The system of claim 10 wherein each of said two side frames includes at least one substantially triangular section.

13. The system of claim 10 further comprising at least two springs coupled to said side frames to form an aperture for receiving said user's gloved hand.

14. A system comprising:
    a frame that receives an adult user's gloved hand, wherein said frame includes a top frame that is substantially rectangular and has two longer edges, wherein said frame includes a plurality of triangular side frames, two of which are attached to each of the longer edges of said top frame, wherein each of said plurality of triangular side frames is perpendicularly coupled to one of said longer edges of said top frame,
    wherein said frame includes a bottom plane defined by two springs for securing said user's gloved hand within said frame, wherein each of said two springs is attached to two of said plurality of triangular side frames; and
    a substantially rectangular plate with each of its two longer edges including a groove, wherein each groove engages each of said longer edges of said top frame such that said substantially rectangular plate slides over said top frame forming a shield to cover and protect said user's gloved hand.

15. A method of welding comprising:
    providing a frame that includes a top frame that is substantially rectangular, said top frame having two longer edges, wherein said frame includes two side frames that are coupled to said top frame, and wherein said frame includes a bottom plane defined by at least one spring;
    receiving a user's gloved hand within the frame; and
    sliding a substantially rectangular plate over said frame to form a shield to cover and protect said user's gloved hand during a welding operation.

16. The method of claim 15 further comprising
    providing an air gap between the frame and substantially rectangular plate.

* * * * *